United States Patent
Schicht et al.

(10) Patent No.: US 7,074,485 B2
(45) Date of Patent: Jul. 11, 2006

(54) PRESTRESSABLE LAYER SYSTEM FOR PARTITION GLASS

(75) Inventors: Heinz Schicht, Bethau (DE); Lars Ihlo, Pflueckuff (DE); Uwe Schmidt, Falkenberg (DE); Herbert Schindler, Torgau (DE)

(73) Assignee: Saint-Gobain Glass France, Courbevoie (FR)

( * ) Notice: Subject to any disclaimer, the term of this patent is extended or adjusted under 35 U.S.C. 154(b) by 0 days.

(21) Appl. No.: 10/522,619

(22) PCT Filed: Aug. 1, 2003

(86) PCT No.: PCT/FR03/02451

§ 371 (c)(1),
(2), (4) Date: Aug. 23, 2005

(87) PCT Pub. No.: WO2004/013059

PCT Pub. Date: Feb. 12, 2004

(65) Prior Publication Data

US 2006/0099427 A1    May 11, 2006

(30) Foreign Application Priority Data

Aug. 1, 2002    (DE) ................. 102 35 154

(51) Int. Cl.
*B32B 17/06* (2006.01)

(52) U.S. Cl. ................ 428/432; 428/697; 428/698; 428/699; 428/701; 428/702; 428/704

(58) Field of Classification Search ............... 428/428, 428/432, 433, 697, 698, 699, 701, 702, 704
See application file for complete search history.

(56) References Cited

U.S. PATENT DOCUMENTS

| 4,749,397 | A | 6/1988 | Lowe et al. |
| 5,110,662 | A | 5/1992 | Depauw et al. |
| 6,159,621 | A | 12/2000 | Schicht et al. |
| 2004/0241490 | A1* | 12/2004 | Finley ................. 428/655 |

* cited by examiner

*Primary Examiner*—Jennifer McNeil
*Assistant Examiner*—G. Blackwell
(74) *Attorney, Agent, or Firm*—Oblon, Spivak, McClelland, Maier & Neustadt, P.C.

(57) ABSTRACT

A low-emissivity multilayer system, capable of being bent and prestressed, for glazing panes, with silver as functional layer, comprises a sacrificial metal layer of Ti or an alloy of Ti and Zn and/or Al placed above the silver layer, antireflection dielectric layers and an oxide, nitride or oxynitride covering layer. The sacrificial metal layer contains chemically bonded hydrogen. An optionally Al- and/or In-doped ZnO layer is adjacent to the sacrificial metal layer. The covering layer consists of a titanium compound. Multilayer systems of this type can be manufactured relatively inexpensively and have a high hardness and a high chemical resistance. Their color parameters are very reproducible, even in the case of a heat treatment at high temperature.

8 Claims, No Drawings

US 7,074,485 B2

1

PRESTRESSABLE LAYER SYSTEM FOR PARTITION GLASS

CROSS REFERENCES TO RELATED APPLICATIONS

This application is a national stage application of International Patent Application No. PCT/FR03/02451, filed on Aug. 1, 2003, and claims priority to German Patent Application No. 102 35 154.6, filed on Aug. 1, 2002, both of which are incorporated herein by reference in their entireties.

The invention relates to a low-emissivity multilayer system, capable of being highly stressed thermally, for glazing panes, with silver as functional layer, a sacrificial metal layer placed above the silver layer, antireflection dielectric layers and an oxide, nitride or oxynitride covering layer.

Low-emissivity multilayer systems must be able to be highly stressed thermally when the coated glazing panes undergo a bending and/or prestressing operation. Although thermally stable layers are not necessary when the panes are coated only after the bending and prestressing, this has the disadvantage that it is not always possible to avoid coating defects. These defects result from the fact that the heat treatment operation often causes local modifications of the glass surface which become visible after the coating operation. In particular, coating before the heat treatment operation also has the economic advantage of simplifying the coating operation because it is possible to coat large panes in large industrial plants. The desired shapes are then cut from the large coated panes and bent and/or prestressed in the accustomed manner.

Multilayer systems capable of being highly stressed thermally are known in various embodiments. In a first group of multilayer systems that can be highly stressed thermally, the antireflection layers each consist of $Si_3N_4$ and are separated from the silver functional layer by thin metal sacrificial layers of CrNi. Multilayer systems that have this structure are, for example, disclosed in documents EP 0 567 735 B1, EP 0 717 014 B1, EP 0 771 766 B1, EP 0 646 551 B1 and EP 0 79.6 825 A2. The multilayer system disclosed in EP 0 883 585 B1 also belongs to this group, but in this case the sacrificial metal layer consists of Si. Although such multilayer systems are thermally very stable, they are very expensive to manufacture because of the known problems that arise when sputtering nitrides. Furthermore, sputtering relatively thick $Si_3N_4$ layers remains problematic because of mechanical stresses in the layers.

Belonging to the second group of multilayer systems capable of being highly stressed thermally are those which, in addition to nitride layers such as $Si_3N_4$ or AlN, also have oxide layers, in particular in the region of the covering layer. For example, DE 196 40 800 C2 discloses a multilayer system in which a nitride or oxynitride interlayer of the metal of the sacrificial metal layer is placed between the metal blocking layer and the oxide or nitride covering layer. Another multilayer system of this type, known from DE 101 05 199 C1, is characterized in that an $Si_3N_4$ or AlN layer is placed between the silver layer and the sacrificial metal layer. In the multilayer system known from EP 0 834 483 B1, a $TiO_2$ interlayer with a thickness of at least 5 nm is placed between a Ti sacrificial metal layer and the covering layer, and a covering layer made of a Bi, Sn or Zn oxide, nitride or oxynitride, or an oxide, nitride or oxynitride of a mixture of these metals, is placed on this interlayer. Both $Si_3N_4$ or AlN interlayers and thick $TiO_2$ layers are complicated to manufacture. Furthermore, thick $TiO_2$ layers with a high refractive index impose high thickness uniformity requirements, and even small variations in the thickness of the layer may result in tinting errors after the prestressing operation.

In a third group of multilayer systems capable of being highly stressed thermally, the individual layers consist purely of oxide layers, with the exception of the functional layer and of the sacrificial metal layer. Since oxide layers can for the most part be sputtered without any problem, such multilayer systems are inexpensive to manufacture. However, in this case, the sacrificial metal layer has a relatively large thickness. A multilayer system of this type is disclosed, for example, in DE 198 52 358 C1. The sacrificial metal consists in this case of an alloy of aluminum with one or more of the elements Mg, Mn, Cu, Zn and Si as alloying components.

Also disclosed, in EP 0 233 003 B1, is a pure oxide multilayer system for glazing panes, which system has to be suitable for undergoing a bending and/or prestressing operation. In this known multilayer system, an Al, Ti, Zn or Ta layer with a thickness of 4 to 15 nm is placed above the silver layer. Preferably, an Al, Ti, Zn or Ta layer is also placed beneath the silver layer.

DE 39 41 027 C2 discloses an oxide multilayer system which must be suitable for undergoing bending and/or prestressing. In this known multilayer system, a ZnO layer with a thickness of at most 15 nm is placed beneath the silver layer, and the silver layer is covered with an oxide of a sacrificial metal of the group: titanium, aluminum, stainless steel, bismuth, zinc, or a mixture of these oxides, which is formed by deposition of the sacrificial metal and its conversion into an oxide.

The reflection color of all the known multilayer systems is visibly modified to a greater or lesser extent after the heat treatment needed to bend and/or prestress the panes. As a general rule, they also have an increased emissivity after the heat treatment and an increased light scattering factor. Because of the change in reflection color, coated panes that have been thermally treated and incorporated into the same wall cladding alongside panes that have not been thermally treated, but do have the same multilayer system, can be recognized with the naked eye. For this reason, another prestressable multilayer system whose properties are comparable to those of a thermally untreated multilayer system is consequently required.

Simultaneous compliance with the three important conditions, namely constancy of closely defined reflection color and, if possible, no increase, or only a slight increase, in the light scattering factor and in the emissivity as a result of the heat treatment operation, is all the more difficult to achieve the higher the requirements in terms of color neutrality of the multilayer system.

The problem on which the invention is based therefore consists in how to develop a multilayer system of neutral color with essentially oxide antireflection layers which, after a heat treatment operation, for example necessary for bending and/or prestressing the glazing pane, exhibit in reflection essentially the same color parameters as a predetermined oxide multilayer system that has not been heat treated, and in which the heat treatment also increases the light scattering factor and the emissivity as little as possible. At the same time, the multilayer system must have a high hardness and a high chemical resistance.

According to the invention, this problem is solved in that the sacrificial metal layer consists of Ti or an alloy of Ti and Zn and/or Al, and contains chemically bonded hydrogen, and in that a ZnO layer optionally doped with Al and/or In is joined to the sacrificial metal layer and in that the covering layer consists of a titanium compound.

Multilayer systems having the structure according to the invention may be manufactured relatively inexpensively and have a high hardness and a high chemical resistance. However, in particular they are characterized in that, with a heat treatment operation, even at high temperature, their color appearance may be modified in a controlled and very reproducible manner and that they exhibit only a very small increase in the light scattering factor and a low emissivity.

Obviously, the composition of the sacrificial metal layer that is sputtered in an $Ar/H_2$ working gas atmosphere plays a particular role. Since metallic Ti has the property of bonding to hydrogen, the protective effect of the sacrificial metal layer with respect to the silver layer is further enhanced by a reducing "hydrogen buffer". The hydrogen in the sacrificial metal layer may be detected using suitable analytical methods.

Titanium alloys containing 50 to 80 wt % Ti and 20 to 50 wt % Al for example have proved to be particularly suitable for the sacrificial metal layer.

The desired result is considerably helped by placing the optionally Al- or In-doped ZnO layer directly on the sacrificial metal layer. This ZnO layer may have a thickness such that the layer itself already constitutes the antireflection layer, in such a way that the covering layer immediately follows this ZnO layer. However, it is also possible to provide only a relatively thin ZnO layer, which then acts as a partial layer of the antireflection layer, whereas the partial layer of the antireflection layer that is joined to it consists, for example, of $SnO_2$. However, in this case it is necessary for the thickness of the ZnO layer to be at least 3 nm.

The covering layer of the multilayer system is preferably a mixed oxide of spinel structure, but binary alloys of the Ti/Al type are also suitable. The following compounds are particularly well suited for the covering layer: $Al:ZnO/TiO_2$, $Al:ZnO/Ti$, $Zn_xSn_yO_z/TiO_2$, $Zn_xSn_yO_z/Ti$, $Zn_xTi_yAl_zO_r$, $Ti_x$-$Al_yO_z$, $Ti_xAl_y$, $Ti_xAl_yN_z$, $Ti_xAl_yO_zN_r$, $Zn_xSn_ySb_zO_r/TiO_2$, $Zn_xSn_ySb_zO_r/Ti$ or $Zn_xSn_yAl_zO_r/TiO_2$. Where there are titanium alloys, they represent the state of the covering layer before the heat treatment operation, during which they are then converted into the oxide form.

Preferred compositions of the sacrificial metal layer and of the other layers of the multilayer system together with the preferred thickness ranges of the individual layers will emerge from the dependent claims.

The invention is described below in greater detail by means of an illustrative example that is compared with a comparative example of the prior art. To evaluate the properties of the layers, the measurements and tests given below are carried out on the coated pane.

A. Measurement of the transmission T at 550 nm of a coated pane.

B. Measurement of the reflection color parameters in a laboratory system (DIN 5033)—an ISO zero standard is used as color reference. It is necessary to maintain fixed tolerance values Δ on the color parameters of this reference standard, which values are defined in the following manner in the case of the multilayer system in question here, in the prestressed state:

ΔL=±3.0; Δa=±1.4; Δb=−3.5 to +1.0.

C. Measurement of the electrical surface resistance using Veeco Instr. FPP 5000 instruments and an SQO HM-1 manual measurement instrument.

D. Measurement of the emissivity E using a Sten Löfving MK2 instrument.

E. Water seepage test according to DIN 50017 with visual evaluation.

F. Electrochemical resistance measurement (EMK test); this test is described in Z. Silikattechnik 32 (1981), page 216. The test provides a conclusion regarding the quality of passivation of the covering layer located above the silver layer, and the corrosion behavior of the Ag layer.

G. Erichsen scrubbing test according to ASTM 2486, with visual evaluation.

H. Measurement of the scratch hardness: a needle under a certain weight is drawn over the coating at a defined rate. The weight in g for which scratch lines are visible serves as a measurement of the scratch hardness.

I. Measurement of the scattered light, in %, with a light scattering measurement instrument from the company Gardner.

COMPARATIVE EXAMPLE

In a continuous industrial coating plant, the multilayer system of the prior art (DE 39 41 027) was applied to float glass by the method of reactive sputtering in a magnetic field, the thickness of the individual layers being given each time in nm: $glass/3TiO_2/22SnO_2/13Al:ZnO/12Ag/5TiAl/20SnO_2/10TiO_2$.

The Al:ZnO layer was reactively sputtered using a ZnAl metal target containing 2% Al by weight. The sacrificial metal layer was sputtered using a metal target containing 64% Ti and 36% Al. The covering layer was deposited by reactive sputtering using a metal titanium target.

The above tests carried out on several specimens before the heat treatment gave on average the following values:

| | |
|---|---|
| A. Transmission | $T_{550}$ = 76–77% |
| B. Color parameters | ΔL −0.1 |
| | Δa 4.47 |
| | Δb −5.31 |
| C. Surface resistance | R = 6.8–6.9 Ω |
| D. Emissivity | E = 7.8 |
| E. Water seepage test | Red spots |
| F. EMK test | 140 mV |
| G. Scrubbing test | Coating starts to debond after 350 passes |
| H. Scratch hardness | 60–210 g |
| I. Scattered light | 0.17% |

Several variously coated specimens, 60×80 cm in size, were heated to 680–700° C. and prestressed by sudden cooling. The tests and measurements described below were then carried out on the prestressed glass specimens. The water seepage test, the EMK test, the scrubbing test and the scratch hardness test were not carried out because, by experience, it is known that these values do not deteriorate after the heat treatment operation. The tests carried out gave the following result:

| | |
|---|---|
| A. Transmission | $T_{550}$ = 88.5% |
| B. Color parameters | ΔL 1.3 |
| | Δa 1.56 |
| | Δb −3.95 |
| C. Surface resistance | R = 4.0–4.6 Ω |
| D. Emissivity | E = 5.8–6.8% |
| I. Scattered light | 0.35% |

The increase in the light scattering factor, from 0.17% to 0.35%, as a result of the heat treatment is still acceptable.

However, an emissivity of 5.8–6.8% is too high for manufacturing insulating panes with a k value of 1.1 W/m²K. The color parameters after prestressing lie outside the tolerance limits. The glazing has, in reflection, a blue-reddish visual appearance. Large variations in the thickness of the various layers also do not allow a neutral reflection color to be obtained with the intended color values.

ILLUSTRATIVE EXAMPLE

The multilayer system according to the invention given below was manufactured on the same coating plant as that of the comparative example using, both for the deposition of the sacrificial metal layer and the deposition of the covering layer, a metal target consisting of an alloy of 64% Ti by weight and 36% Al by weight: glass/25SnO$_2$/9Al:ZnO/11.5Ag/2TiAl(TiH$_x$)/5Al:ZnO/33SnO$_2$/3Ti$_x$Al$_y$O$_z$N$_r$.

The sacrificial metal layer was deposited in an Ar/H$_2$ (90/10 vol %) working gas mixture and the oxynitride covering layer was deposited in an Ar/N$_2$/O$_2$ working gas mixture.

The measurements and the tests on the coated glazing before the heat treatment gave the following values:

| | |
|---|---|
| A. Transmission | $T_{550}$ = 78.3% |
| B. Color parameters | ΔL –0.9 |
| | Δa 2.80 |
| | Δb –3.8 |
| C. Surface resistance | R = 5.7 Ω |
| D. Emissivity | E = 6.6–6.7% |
| E. Water seepage test | No defect |
| F. EMK test | 64 mV |
| G. Scrubbing test | No marks after 1000 passes |
| H. Scratch hardness | 150–260 g |
| I. Scattered light | 0.18% |

After the prestressing operation, the same measurements and the same tests as in the case of the prestressed panes of the comparative example were carried out on several specimens. The tests gave the following results:

| | |
|---|---|
| A. Transmission | $T_{550}$ = 88.3% |
| B. Color parameters | ΔL 1.0 |
| | Δa 1.2 |
| | Δb –2.4 |
| C. Surface resistance | R = 3.6–4.0 Ω |
| D. Emissivity | E = 4.8–5.0 |
| I. Scattered light | 0.27% |

Both on the thermally untreated coating and on the thermally treated coating, the values obtained demonstrate significant improvements. In particular, the thermally treated coating satisfies the predetermined color parameters. The reflection color is substantially more neutral than in the comparative example. The functional dependence between surface resistance and emissivity corresponds better to the physical dependence and allows insulating glazing to be manufactured with a k value of 1.1 W/m²K. The proportion of scattered light is increased significantly less by the heat treatment than in the comparative example. This indicates that the Ag layer is only slightly destructured. The result of the other tests, for example the water seepage test, the EMK test, the scrubbing test and the scratch hardness test that were carried out on the thermally untreated specimens are better than the average. The multilayer system can be manufactured in a stable and reproducible manner on an industrial coating plant.

The invention claimed is:

1. A low-emissivity multilayer system, capable of being highly stressed thermally, comprising a functional layer which comprises a silver, a sacrificial metal layer placed above the silver layer, antireflection dielectric layers and an oxide, nitride or oxynitride covering layer, wherein said sacrificial metal layer consists of Ti or an alloy of Ti and Zn and/or Al, and chemically bonded hydrogen, and wherein a ZnO layer optionally doped with Al and/or In is joined to said sacrificial metal layer and wherein said covering layer consists of a titanium compound.

2. The multilayer system as claimed in claim 1, wherein said sacrificial metal layer consists of a TiAl alloy having 20 to 50% Al by weight and the chemically bonded hydrogen.

3. The multilayer system as claimed in claim 1, wherein said sacrificial metal layer has a layer thickness of 1 to 5 nm.

4. The multilayer system as claimed in claim 1, wherein said ZnO layer comprises 0.5 to 10% Al and/or In by weight.

5. The multilayer system as claimed in claim 4, wherein said ZnO layer has a thickness of at least 3 nm.

6. The multilayer system as claimed in claim 1, wherein an SnO$_2$, Si$_3$N$_4$, ZnO, Al$_2$O$_3$ and/or SiO$_2$ layer is placed as partial layer of the upper antireflection dielectric layer between the ZnO layer and the covering layer.

7. The multilayer system as claimed in claim 1, wherein said covering layer consists of Al:ZnO/TiO$_2$, Al:ZnO/Ti, Zn$_x$Sn$_y$O$_z$/TiO$_2$, Zn$_x$Sn$_y$O$_z$/Ti, Zn$_x$Ti$_y$Al$_z$O$_r$, Ti$_x$Al$_y$O$_z$, Ti$_x$-Al$_y$, Ti$_x$Al$_y$N$_z$, Ti$_x$Al$_y$O$_z$N$_r$, Zn$_x$Sn$_y$Sb$_z$O$_r$/TiO$_2$, Zn$_x$Sn$_y$Sb$_z$O$_r$/Ti or Zn$_x$Sn$_y$Al$_z$O$_r$/TiO$_2$.

8. The multilayer system as claimed in claim 1, wherein the multilayer structure is:

glass/SnO$_2$/Al:ZnO/Ag/TiAl(TiH$_x$)/Al:ZnO/SnO$_2$/Al:ZnO/Ti$_x$Al$_y$O$_z$N$_r$.

* * * * *